United States Patent
Yu et al.

(10) Patent No.: US 11,087,617 B2
(45) Date of Patent: Aug. 10, 2021

(54) VEHICLE CROWD SENSING SYSTEM AND METHOD

(71) Applicant: GM GLOBAL TECHNOLOGY OPERATIONS LLC, Detroit, MI (US)

(72) Inventors: Bo Yu, Troy, MI (US); Fan Bai, Ann Arbor, MI (US); Jinzhu Chen, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 337 days.

(21) Appl. No.: 16/199,919

(22) Filed: Nov. 26, 2018

(65) Prior Publication Data

US 2020/0166941 A1    May 28, 2020

(51) Int. Cl.
| | | |
|---|---|---|
| *G08G 1/01* | (2006.01) | |
| *G08G 1/0967* | (2006.01) | |
| *G06F 17/18* | (2006.01) | |
| *G07C 5/00* | (2006.01) | |
| *G01C 21/36* | (2006.01) | |
| *B60W 40/04* | (2006.01) | |
| *B60W 40/06* | (2012.01) | |

(52) U.S. Cl.
CPC ....... *G08G 1/0141* (2013.01); *G01C 21/3697* (2013.01); *G06F 17/18* (2013.01); *G07C 5/008* (2013.01); *G08G 1/0112* (2013.01); *G08G 1/096741* (2013.01); *G08G 1/096791* (2013.01); *B60W 40/04* (2013.01); *B60W 40/06* (2013.01)

(58) Field of Classification Search
CPC ........... G08G 1/0141; G08G 1/096741; G08G 1/0112; G08G 1/096791; G01C 21/3697; G07C 5/008; G06F 17/18; B60W 40/04; B60W 40/06
See application file for complete search history.

(56) References Cited

U.S. PATENT DOCUMENTS

| | | | |
|---|---|---|---|
| 7,277,028 B1 * | 10/2007 | Janke ............... | G08G 1/096791 701/117 |
| 8,090,524 B2 * | 1/2012 | Chapman et al. ... | G08G 1/0141 701/117 |
| 8,478,209 B2 | 7/2013 | Bai et al. | |
| 8,731,577 B2 | 5/2014 | Bai et al. | |
| 9,021,049 B2 | 4/2015 | Bai et al. | |
| 9,154,923 B2 | 10/2015 | Bai et al. | |
| 9,237,197 B2 | 1/2016 | Bai et al. | |
| 9,246,970 B2 | 1/2016 | Bai et al. | |
| 9,430,476 B2 | 8/2016 | Bai et al. | |
| 9,928,524 B2 | 3/2018 | Grimm et al. | |

(Continued)

*Primary Examiner* — Dale W Hilgendorf
(74) *Attorney, Agent, or Firm* — Lorenz & Kopf LLP (57) ABSTRACT

A vehicle crowd sensing system and method of selective sensing for the vehicle crowd sensing system. The method, in one implementation, involves receiving a plurality of detection reports from a first set of vehicles, each detection report including an event, a position qualifier of the event, and a severity qualifier of the event; developing an inherent error model for the event that includes a compilation of the position qualifiers of the event and the severity qualifiers of the event; and determining a resampling instruction for the event. The resampling instruction is based on an action model and the action model is at least partly a factor of the inherent error model.

14 Claims, 3 Drawing Sheets

(56) References Cited

U.S. PATENT DOCUMENTS

| | | | |
|---|---|---|---|
| 2006/0178814 A1* | 8/2006 | Everett | G08G 1/096791 701/466 |
| 2008/0091339 A1* | 4/2008 | Nagase et al. | G08G 1/096741 701/532 |
| 2010/0207787 A1* | 8/2010 | Catten et al. | G08G 1/096741 701/31.4 |
| 2013/0154854 A1* | 6/2013 | Chen | G08G 1/096775 340/905 |
| 2013/0238432 A1 | 9/2013 | Bai et al. | |
| 2013/0289859 A1* | 10/2013 | Kim | G08G 1/096791 701/117 |
| 2014/0085107 A1* | 3/2014 | Guiterrez | G01C 21/3697 340/905 |
| 2014/0278031 A1* | 9/2014 | Scofield et al. | G08G 1/096741 701/118 |
| 2014/0278074 A1* | 9/2014 | Annapureddy et al. | G08G 1/096791 701/468 |
| 2014/0358840 A1* | 12/2014 | Tadic et al. | G07C 5/008 706/52 |
| 2015/0227492 A1 | 8/2015 | Bai et al. | |
| 2015/0262198 A1 | 9/2015 | Bai et al. | |
| 2015/0344038 A1* | 12/2015 | Stenneth et al. | G07C 5/0816 340/103 |
| 2016/0044519 A1 | 2/2016 | Bai et al. | |
| 2016/0063045 A1* | 3/2016 | Stanek et al. | G08G 1/0112 707/741 |
| 2016/0117921 A1* | 4/2016 | D'Amato et al. | G08G 1/096741 701/117 |
| 2017/0349148 A1* | 12/2017 | Bojanowski et al. | G07C 5/008 |

* cited by examiner

VEHICLE CROWD SENSING SYSTEM AND METHOD

INTRODUCTION

The field of technology relates to selective sensing methods for vehicle crowd sensing systems.

Vehicles upload event-based information to a backend facility (e.g., a cloud server or the like) for processing. Information regarding events such as heavy traffic, potholes, slippery roads, etc., can be aggregated and then sent to other vehicles that may encounter those events. Once inferred events are detected, more detection reports regarding those events are oftentimes uploaded to the backend facility. These subsequent detection reports are a resampling of the previously inferred event, and can help corroborate the previously inferred event. However, if there is sufficient information to determine that the event is likely a ground-truth, then it may be advantageous to minimize corroboration to thereby minimize unnecessary data usage.

SUMMARY

According to one embodiment, there is provided a method of selective sensing for a vehicle crowd sensing system, comprising the steps of: receiving a plurality of detection reports from a first set of vehicles, wherein each detection report includes an event, a position qualifier of the event, and a severity qualifier of the event; developing an inherent error model for the event, wherein the inherent error model includes a compilation of the position qualifiers of the event and the severity qualifiers of the event; and determining a resampling instruction for the event, wherein the resampling instruction is based on an action model and the action model is at least partly a factor of the inherent error model.

According to various embodiments, this method may further include any one of the following features or any technically-feasible combination of some or all of these features:
  transmitting the resampling instruction for the event to a second set of vehicles;
  the second set of vehicles are within a prescribed temporal or spatial range of the event;
  the resampling instruction causes a first portion of the second set of vehicles to upload detection reports for the event;
  the resampling instruction causes a second portion of the second set of vehicles to not upload detection reports for the event;
  the inherent error model includes a number of uploaded detection reports for the event, a standard deviation of the position qualifiers for the event, and a standard deviation of the severity qualifiers for the event;
  the number of uploaded detection reports for the event, the standard deviation of the position qualifiers for the event, and the standard deviation of the severity qualifiers for the event are used to develop a hybrid criteria model;
  the hybrid criteria model weights the number of uploaded detection reports for the event, the standard deviation of the position qualifiers for the event, and the standard deviation of the severity qualifiers for the event;
  the weights are calibratable values based on a classification of the event;
  the hybrid criteria model provides a hybrid criteria value calculated in accordance with the following:

$$h = w_1 \cdot \frac{n - n_{p0}}{n_{p0}} + w_2 \cdot \frac{n - n_{s0}}{n_{s0}} + w_3 \cdot \frac{s_{p0} - s_p}{s_{p0}} + w_4 \cdot \frac{s_{s0} - s_s}{s_{s0}}$$

wherein h is the hybrid criteria value; $w_1$, $w_2$, $w_3$, and $w_4$ are the weights; $s_p$ is the standard deviation of the position qualifiers for the event; $s_s$ is the standard deviation of the severity qualifiers for the event; and $n_{p0}$, $n_{s0}$, $s_{p0}$, and $s_{s0}$ are reference targets;
  when the hybrid criteria value is less than a hybrid criteria threshold, the action model is disabled and the resampling instruction is 0%;
  when the hybrid criteria value is greater than a hybrid criteria threshold, the action model is enabled and the resampling instruction is between 0% and 100%;
  the action model includes a proportional/integral/derivative (PID) policy evaluation;
  the proportional/integral/derivative (PID) policy evaluation includes a proportion of the hybrid criteria model, an integral of the hybrid criteria model, and a derivative of the hybrid criteria model, each of the proportion, the integral, and the derivative being selectively usable for the action model; and/or
  the detection report includes a set of time qualifiers of the event.

According to another embodiment, there is provided a method of selective sensing for a vehicle crowd sensing system, comprising the steps of: receiving, at a vehicle, a resampling instruction from a backend facility for an event, wherein the resampling instruction is based on an action model and the action model is at least partly a factor of an inherent error model, wherein the inherent error model includes a compilation of a plurality of position qualifiers of the event and a plurality of severity qualifiers of the event; determining whether the resampling instruction provides for uploading or non-uploading; when the resampling instruction for the event provides for uploading, uploading a detection report for the event to the backend facility, wherein the detection report includes a position qualifier of the event and a severity qualifier of the event; and when the resampling instruction for the event provides for non-uploading, not uploading the detection report for the event to the backend facility.

According to various embodiments, this method may further include any one of the following features or any technically-feasible combination of some or all of these features:
  the resampling instruction is a probability, and the determining step uses the probability, a base sampling rate, a local cost, and a local confidence to determine whether the resampling instruction provides for uploading or non-uploading; and/or
  the base sampling rate, the local cost, and the local confidence are individual vehicles' parameters.

According to yet another embodiment, there is provided a vehicle crowd sensing system, comprising: a server that includes a processor and computer-readable memory, the computer-readable memory storing a computer program; and a database that is accessible by the server, the database storing a plurality of detection reports for an event, wherein each detection report includes a position qualifier of the event and a severity qualifier of the event; wherein the computer program, when executed by the processor, causes the server to: develop an inherent error model for the event, wherein the inherent error model includes a compilation of a plurality of position qualifiers of the event and a plurality of severity qualifiers of the event, and determine a resampling instruction for the event, wherein the resampling instruction is based on an action model and the action model is at least partly a factor of the inherent error model.

BRIEF DESCRIPTION OF THE DRAWINGS

One or more embodiments will hereinafter be described in conjunction with the appended drawings, wherein like designations denote like elements, and wherein.

DETAILED DESCRIPTION

The systems and methods described below provide for selective crowd sensing of vehicle data, while helping to maintain accurate event detection and minimize data usage. Vehicle data may include detection reports which include an event (e.g., a pothole, heavy traffic, etc.), a position qualifier of the event (e.g., GPS coordinates, lane indicator, etc.), and a severity qualifier of the event (e.g., a severity ranking, confidence value, etc.). These detection reports are uploaded to a backend facility, such as a cloud server, for aggregation and inference of ground-truth events. Reports of the event are then transmitted to vehicles within the area of the event. In some instances, it may not be necessary to corroborate existence of the event when the event is encountered by subsequent vehicles (e.g., resampling). Various models, such as an inherent error model and an action model, are used to determine a resampling instruction for the event, in order to help minimize the number of detection reports that need to be uploaded from other vehicles. The methods and systems herein were shown to unexpectedly reduce cellular communication costs by significant amounts while maintaining accurate event detection.

Figure 1:
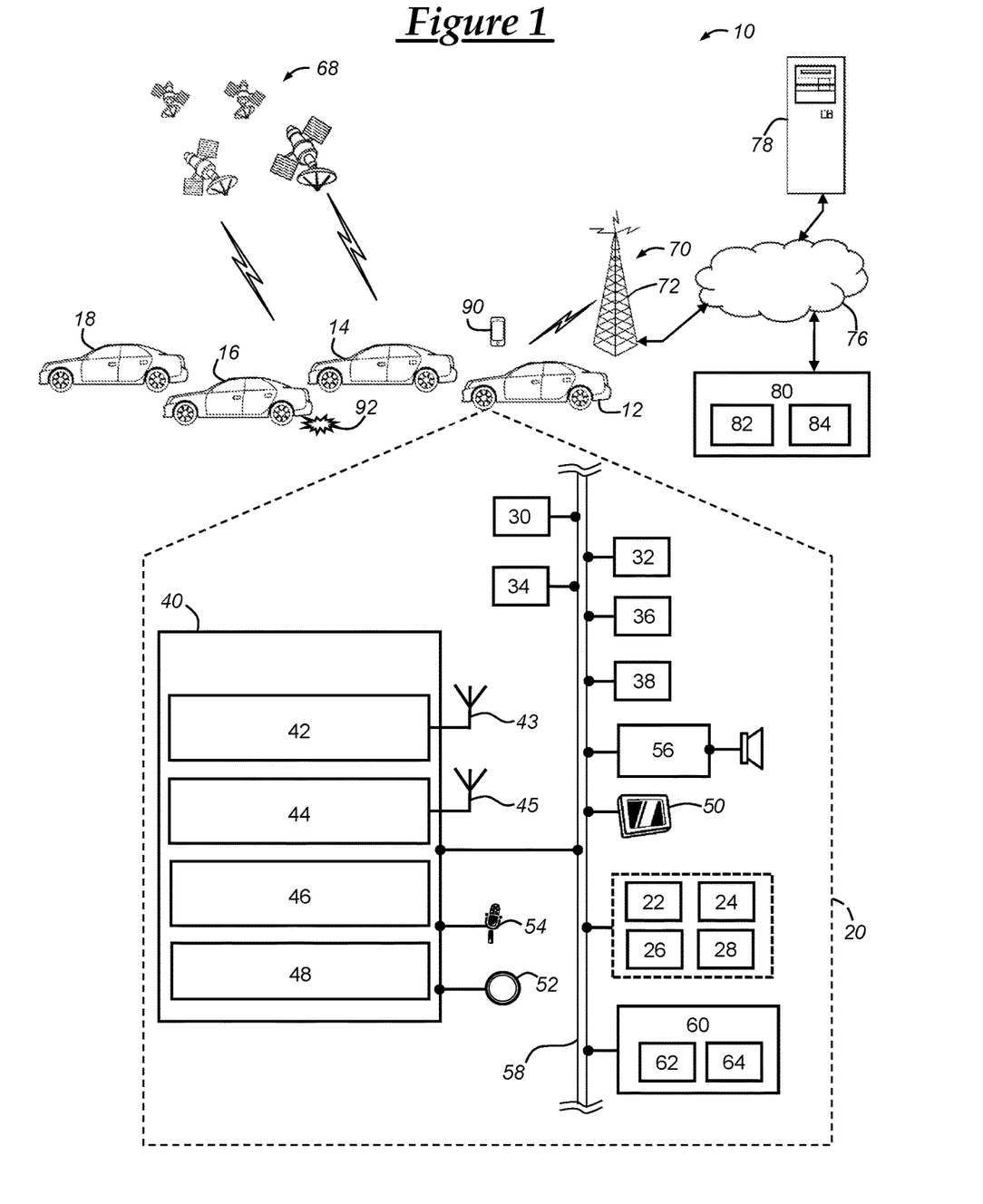
FIG. 1 is a block diagram depicting an embodiment of a vehicle crowd sensing system that is capable of utilizing the methods disclosed herein.

With reference to FIG. 1, there is shown an operating environment that comprises a crowd sensing system 10 which can be used to implement the methods disclosed herein. Crowd sensing system 10 generally includes vehicles 12-18, although more or less vehicles can be included and will likely vary depending on various factors such as vehicle functional capabilities, population density, etc. Various vehicle components are shown with respect to the vehicle 12, but it should be understood that the other vehicles 14-18 may have similar components, such as sensors 22-32 and 36, a V2X unit 34, a GNSS receiver 38, a wireless communications device 40, other vehicle system modules (VSMs) 50-56, and an electronic control unit (ECU) 60. Accordingly, the discussion herein relating to vehicle 12 may also be applicable to the other vehicles 14-18 in the crowd sensing system 10. Crowd sensing system 10 further includes a constellation of global navigation satellite system (GNSS) satellites 68, one or more wireless carrier systems 70, a land communications network 76, a computer or server 78, and a backend facility 80. It should be understood that the disclosed method can be used with any number of different systems and is not specifically limited to the operating environment shown here. The following paragraphs provide a brief overview of one such crowd sensing system 10; however, other systems not shown here could employ the disclosed methods as well. It should also be appreciated that the crowd sensing system 10 and methods may be used with any type of vehicle, including traditional passenger vehicles, sports utility vehicles (SUVs), cross-over vehicles, trucks, vans, buses, recreational vehicles (RVs), motorcycles, etc. These are merely some of the possible applications, as the crowd sensing system and methods described herein are not limited to the exemplary embodiment shown in FIG. 1 and could be implemented with any number of different vehicles.

Any number of different sensors, components, devices, modules, systems, etc. may provide the crowd sensing system 10 with information, data and/or other input. These include, for example, the components shown in FIG. 1, as well as others that are known in the art but are not shown here. It should be appreciated that the host vehicle sensors, V2X unit, object detection sensors, GNSS receiver, ECU, HMIs, as well as any other component that is a part of and/or is used by the crowd sensing system 10 may be embodied in hardware, software, firmware or some combination thereof. These components may directly sense or measure the conditions for which they are provided, or they may indirectly evaluate such conditions based on information provided by other sensors, components, devices, modules, systems, etc. Furthermore, these components may be directly coupled to a control module or ECU 60, indirectly coupled via other electronic devices, a vehicle communications bus, network, etc., or coupled according to some other arrangement known in the art. These components may be integrated within another vehicle component, device, module, system, etc. (e.g., sensors that are already a part of an engine control module (ECM), traction control system (TCS), electronic stability control (ESC) system, antilock brake system (ABS), etc.), they may be stand-alone components (as schematically shown in FIG. 1), or they may be provided according to some other arrangement. In some instances, multiple sensors might be employed to sense a single parameter (e.g., for providing redundancy). It should be appreciated that the foregoing scenarios represent only some of the possibilities, as any type of suitable arrangement or architecture may be used to carry out the methods described herein.

The host vehicle sensors 22-30 may include any type of sensing or other component that provides the present systems and methods with data or information regarding the performance, state and/or condition of the vehicle 12. Information from the host vehicle sensors 22-30 may be used to extrapolate information regarding events (road conditions, traffic patterns or disruptions, etc.). According to the non-limiting example shown in FIG. 1, the host vehicle sensors include host vehicle speed sensors 22-28 and a dynamic sensor unit 30.

The host vehicle speed sensors 22-28 provide the system 10 with speed readings that are indicative of the rotational speed of the wheels, and hence the overall speed or velocity of the vehicle. In one embodiment, individual wheel speed sensors 22-28 are coupled to each of the vehicle's four wheels and separately provide speed readings indicating the rotational velocity of the corresponding wheel (e.g., by counting pulses on one or more rotating wheel(s)). Skilled artisans will appreciate that these sensors may operate according to optical, electromagnetic or other technologies, and that speed sensors 22-28 are not limited to any particular speed sensor type. In another embodiment, the speed sensors could be coupled to certain parts of the vehicle, such as an output shaft of the transmission or behind the speedometer, and produce speed readings from these measurements. It is also possible to derive or calculate speed readings from acceleration readings (skilled artisans appreciate the relationship between velocity and acceleration readings). In another embodiment, speed sensors 22-28 determine vehicle speed relative to the ground by directing radar, laser and/or other signals towards the ground and analyzing the reflected signals, or by employing feedback from a navigation unit that has Global Positioning System (GPS) capabilities (e.g., GNSS receiver 38). It is possible for the speed readings to be provided to the system 10 by some other module, subsystem, system, etc., like a powertrain or engine control module or a brake control module. Any other known speed sensing techniques may be used instead.

Dynamic sensor unit 30 provides the system with dynamic readings that pertain to the various dynamic conditions occurring within the vehicle, such as acceleration and yaw rate. Unit 30 may include any combination of sensors or sensing elements that detect or measure vehicle dynamics, and it may be packaged separately or in a single unit. According to one exemplary embodiment, dynamic sensor unit 30 is an integrated inertial measurement unit (IMU) that includes a yaw rate sensor, a lateral acceleration sensor, and a longitudinal acceleration sensor. Some examples of suitable acceleration sensor types include micro-electromechanical system (MEMS) type sensors and tuning fork-type sensors, although any type of acceleration sensor may be used. Depending on the particular needs of the system, the acceleration sensors may be single- or multi-axis sensors, may detect acceleration and/or deceleration, may detect the magnitude and/or the direction of the acceleration as a vector quantity, may sense or measure acceleration directly, may calculate or deduce acceleration from other readings like vehicle speed readings, and/or may provide the g-force acceleration, to cite a few possibilities. Although dynamic sensor unit 30 is shown as a separate unit, it is possible for this unit or elements thereof to be integrated into some other unit, device, module, system, etc.

Object detection sensor 32 provides the system 10 with object data that pertain to nearby vehicles, pedestrians, or other objects surrounding the vehicle 12. The object readings can be representative of the presence, position, velocity, and/or acceleration of nearby vehicles, as well as of nearby pedestrians and other objects. This data may be absolute in nature (e.g., an object velocity or acceleration relative to ground or some other frame of reference) or the data may be relative in nature (e.g., an object velocity or acceleration relative to the host vehicle). The data from object detection sensor 32 may also be used instead of, or to otherwise supplement or corroborate, the information provided by a V2X unit 34 and/or the GNSS receiver 38. While only one object detection sensor 32 is schematically illustrated, in some embodiments, multiple object detection sensors are included to monitor various positions around the vehicle 12. Each of the object detection sensors may be a single sensor or a combination of sensors, and may include one or more RADAR devices, laser devices, LIDAR devices, ultrasound devices, vision devices (e.g., camera, etc.), other known devices or combinations thereof.

The V2X unit 34 provides data relating to other vehicles, infrastructure, etc. near the vehicle 12. The V2X unit 34 may receive wireless messages over an inter-vehicle communication network, such as a dedicated short range communication (DSRC) or cellular protocol, or it may work with other components such as the wireless communication device 40. The wireless messages may be transmitted as a standard periodic beacon message that includes data relating to vehicle positions, vehicle kinematics/dynamic parameters such as speed values or data relating to speed values, or traffic or road events sensed by remote vehicles. The V2X unit 34 may be able to provide information about remote vehicles that are not readily seen or detectable via object detection sensor 34. The V2X unit 34 may be V2V (vehicle-to-vehicle) capable, V2I (vehicle-to-infrastructure) capable, and/or V2P (vehicle-to-pedestrian) capable. Although the V2X unit 34 is shown as a separate unit, it is possible for this unit or elements thereof to be integrated into some other unit, device, module, system, etc., such as a telematics unit or an active safety module, to cite two examples.

Ambient sensor 36 provides the system 10 with ambient readings regarding outside weather events or other environmental events that could affect driving. For example, ambient sensor 36 may report an outside temperature, an outside humidity, current or recent data on precipitation, road conditions, or any other type of environmental readings. By knowing the outside temperature and the amount of recent precipitation, for instance, the present system and method may develop detection reports for slippery road events or the like. The ambient sensor 36 may determine environmental conditions by directly sensing and measuring such conditions, indirectly determining environmental readings by gathering them from other modules or systems in the vehicle, or by receiving wireless transmissions that include weather reports, forecasts, etc. from a weather-related service or website.

Of course, other vehicle sensors that provide information as to the state of the vehicle 12 could be used in addition to or in lieu of those described above. Some potential examples include steering angle sensors, accelerator and brake pedal sensors, stability sensors, and gear selection sensors, to cite just a few. Further, some implementations of the present systems and methods may not have all of the vehicle sensors or other components described herein.

Global navigation satellite system (GNSS) receiver 38 receives radio signals from a constellation of GNSS satellites 68. GNSS receiver 38 can be configured to comply with and/or operate according to particular regulations or laws of a given geopolitical region (e.g., country). The GNSS receiver 38 can be configured for use with various GNSS implementations, including global positioning system (GPS) for the United States, BeiDou Navigation Satellite System (BDS) for China, Global Navigation Satellite System (GLONASS) for Russia, Galileo for the European Union, and various other navigation satellite systems. For example, the GNSS receiver 38 may be a GPS receiver, which may receive GPS signals from a constellation of GPS satellites 68. And, in another example, GNSS receiver 38 can be a BDS receiver that receives a plurality of GNSS (or BDS) signals from a constellation of GNSS (or BDS) satellites 68. In either implementation, GNSS receiver 38 can include at least one processor and memory, including a non-transitory computer readable memory storing instructions (software) that are accessible by the processor for carrying out the processing performed by the receiver 38.

GNSS receiver 38 may be used to provide navigation and other position-related services to the vehicle operator. Navigation information, such as information concerning upcoming events that may impact travel, can be presented on the display 50 or can be presented verbally such as is done when supplying turn-by-turn navigation. The navigation services can be provided using a dedicated in-vehicle navigation module (which can be part of GNSS receiver 38 and/or incorporated as a part of wireless communications device 40 or other VSM), or some or all navigation services can be done via the vehicle communications device 40 (or other telematics-enabled device) installed in the vehicle, wherein the position or location information is sent to a remote location for purposes of providing the vehicle with navigation maps, map annotations (points of interest, restaurants, etc.), route calculations, and the like. The position information can be supplied to the vehicle backend facility 80 or other remote computer system, such as computer 78, for other purposes, such as fleet management and/or for use in the crowd sensing methods discussed below. Also, information regarding inferred events that is stored on database 84, such as information relating to an upcoming pothole 92 or the like, can be downloaded to the GNSS receiver 38 from the backend facility 80 via vehicle communications device 40.

Wireless communications device 40 is capable of communicating data via short-range wireless communications (SRWC) and/or via cellular network communications through use of a cellular chipset 44, as depicted in the illustrated embodiment. In one embodiment, the wireless communications device 40 is a central vehicle computer that is used to carry out at least part of the methods discussed below. In the illustrated embodiment, wireless communications device 40 includes an SRWC circuit 42, a cellular chipset 44, a processor 46, memory 48, and antennas 43 and 45. In one embodiment, wireless communications device 40 may be a standalone module or, in other embodiments, device 40 may be incorporated or included as a part of one or more other vehicle system modules, such as a center stack module (CSM), a body control module (BCM), an infotainment module, a head unit, and/or a gateway module. In some embodiments, the device 40 can be implemented as an OEM-installed (embedded) or aftermarket device that is installed in the vehicle. In some embodiments, the wireless communications device 40 is a telematics unit (or telematics control unit) that is capable of carrying out cellular communications using one or more cellular carrier systems 70. The telematics unit can be integrated with the GNSS receiver 38 so that, for example, the GNSS receiver 38 and the wireless communications device (or telematics unit) 40 are directly connected to one another as opposed to being connected via communications bus 58.

In some embodiments, the wireless communications device 40 can be configured to communicate wirelessly according to one or more short-range wireless communications (SRWC) such as any of the Wi-Fi™, WiMAX™, Wi-Fi Direct™, other IEEE 802.11 protocols, ZigBee™, Bluetooth™, Bluetooth™ Low Energy (BLE), or near field communication (NFC). As used herein, Bluetooth™ refers to any of the Bluetooth™ technologies, such as Bluetooth Low Energy™ (BLE), Bluetooth™ 4.1, Bluetooth™ 4.2, Bluetooth™ 5.0, and other Bluetooth™ technologies that may be developed. As used herein, Wi-Fi™ or Wi-Fi™ technology refers to any of the Wi-Fi™ technologies, such as IEEE 802.11b/g/n/ac or any other IEEE 802.11 technology. The short-range wireless communication (SRWC) circuit 42 enables the wireless communications device 40 to transmit and receive SRWC signals, such as BLE signals. The SRWC circuit may allow the device 40 to connect to another SRWC device. Additionally, in some embodiments, the wireless communications device may contain a cellular chipset 44 thereby allowing the device to communicate via one or more cellular protocols, such as those used by cellular carrier system 70. In such a case, the wireless communications device becomes user equipment (UE) usable in carrying out cellular communications via cellular carrier system 70.

Wireless communications device 40 may enable vehicle 12 to be in communication with one or more remote networks (e.g., one or more networks at backend facility 80 or computers 78) via packet-switched data communication. This packet-switched data communication may be carried out through use of a non-vehicle wireless access point that is connected to a land network via a router or modem. When used for packet-switched data communication such as TCP/IP, the communications device 40 can be configured with a static IP address or can be set up to automatically receive an assigned IP address from another device on the network such as a router or from a network address server.

Packet-switched data communications may also be carried out via use of a cellular network that may be accessible by the device 40. Communications device 40 may, via cellular chipset 44, communicate data over wireless carrier system 70. In such an embodiment, radio transmissions may be used to establish a communications channel, such as a voice channel and/or a data channel, with wireless carrier system 70 so that voice and/or data transmissions can be sent and received over the channel. Data can be sent either via a data connection, such as via packet data transmission over a data channel, or via a voice channel using techniques known in the art. For combined services that involve both voice communication and data communication, the system can utilize a single call over a voice channel and switch as needed between voice and data transmission over the voice channel, and this can be done using techniques known to those skilled in the art.

Processor 46 can be any type of device capable of processing electronic instructions including microprocessors, microcontrollers, host processors, controllers, vehicle communication processors, and application specific integrated circuits (ASICs). It can be a dedicated processor used only for communications device 40 or can be shared with other vehicle systems. Processor 46 executes various types of digitally-stored instructions, such as software or firmware programs stored in memory 48, which enable the device 40 to provide a wide variety of services. For instance, processor 46 can execute programs or process data to carry out at least a part of the method discussed herein. Memory 48 may be a temporary powered memory, any non-transitory computer-readable medium, or other type of memory. For example, the memory can be any of a number of different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), magnetic or optical disc drives. Similar components to those previously described (processor 46 and/or memory 38, as well as SRWC circuit 42 and cellular chipset 44) can be included in another control module and/or various other VSMs that typically include such processing/storing capabilities.

The wireless communications device 40 is connected to the bus 58, and can receive sensor data from one or more vehicle sensors 22-32, 36 and/or the V2X unit 34, and, thereafter, the vehicle 12 can send this data (or other data derived from or based on this data) to other devices or networks, including the vehicle backend services facility 80. In some embodiments, however, all or some data is processed by the ECU 60 or another module. In one embodiment, this data is sent in the form of detection reports that include an event (e.g., pothole 92), a position qualifier of the event (e.g., GPS coordinates), and a severity qualifier of the event (e.g., a value that takes into account the impact of the pothole 92 on one or more of the sensors). And, in another embodiment, the wireless communications device 40 can be incorporated with or at least connected to, a navigation system that includes geographical map information including geographical roadway map data and/or a data from detection reports of other vehicles, such as vehicles 14-18. The navigation system can be communicatively coupled to the GNSS receiver 38 (either directly or via communications bus 58) and can include an on-board geographical map database that stores local geographical map information. This local geographical map information can be provisioned in the vehicle 12 and/or downloaded via a remote connection to a geographical map database/server, such as computer 78 and/or backend facility 80 (including servers 82 and databases 84). The on-board geographical map database can store geographical map information corresponding to a location or region of the vehicle so as to not include a large amount of data, much of which may never be used. Moreover, as the vehicle 12 enters different locations or regions, the vehicle can inform the vehicle backend facility 80 of the vehicle's location (e.g., obtained via use of GNSS receiver 38) and, in response to receiving the vehicle's new location, the servers 82 can query databases 84 for the corresponding geographical map information, which can then be sent to the vehicle 12.

Vehicle electronics 20 also includes a number of vehicle-user interfaces that provide vehicle occupants with a means of providing and/or receiving information, including visual display 50, pushbutton(s) 52, microphone 54, and audio system 56. As used herein, the term "vehicle-user interface" broadly includes any suitable form of electronic device, including both hardware and software components, which is located on the vehicle 12 and enables a vehicle user to communicate with or through a component of the vehicle. Vehicle-user interfaces 50-54 are also onboard vehicle sensors that can receive input from a user or other sensory information. The pushbutton(s) 52 allow manual user input into the communications device 40 to provide other data, response, or control input. Audio system 56 provides audio output to a vehicle occupant and can be a dedicated, stand-alone system or part of the primary vehicle audio system. According to the particular embodiment shown here, audio system 56 is operatively coupled to both vehicle bus 58 and an entertainment bus (not shown) and can provide AM, FM and satellite radio, CD, DVD and other multimedia functionality. This functionality can be provided in conjunction with or independent of an infotainment module. Microphone 54 provides audio input to the wireless communications device 40 to enable the driver or other occupant to provide voice commands and/or carry out hands-free calling via the wireless carrier system 70. For this purpose, it can be connected to an on-board automated voice processing unit utilizing human-machine interface (HMI) technology known in the art. Visual display or touch screen 50 is preferably a graphics display and can be used to provide a multitude of input and output functions. Display 50 can be a touch screen on the instrument panel, a heads-up display reflected off of the windshield, or a projector that can project graphics for viewing by a vehicle occupant. Various other vehicle-user interfaces can also be utilized, such as a mobile device 90, as the interfaces of FIG. 1 are only an example of one particular implementation.

A user of the vehicle 12 can use one or more vehicle-user interfaces, as discussed more below, to input information regarding various events that may impact travel. In one embodiment, the user can operate one or more vehicle-user interfaces 50-56, which can then deliver inputted information to other VSMs, such as the wireless communications device 40. The wireless communications device 40 can then send this information in the form of a detection report to the backend facility 80 using the cellular chipset 44 or other communications means. Additionally, in one example, the user can use the touchscreen display 50 to enter a desired destination to which the user would like to travel to. The destination can include a physical address (e.g., 1234 Main Street, Central City, Mich.) or can include a point of interest or other geographical indicator. The destination can be represented in many forms, such as through geographical coordinates or textual data that is embodied in a vehicle navigational request message. A departure location can also be specified in the vehicle navigational request message. The departure location can be specified by the user via the vehicle-user interfaces, or may be determined or preset to be the vehicle's current location, which can be determined using GNSS receiver 38 or through use of other location services. This vehicle navigational request message can then be sent using the wireless communications device 40 (e.g., through SRWC circuitry 42 or cellular chipset 44) to the backend facility 80 or other remote computing system (e.g., computer 78), which can then provide navigational information to the vehicle 12. This navigational information can be displayed on the display 50, or may be presented via use of other vehicle-user interfaces that can be used for presenting output. The navigational information can describe one or more events along the route that have been sensed by other vehicles.

The ECU 60 controls various components of the crowd sensing system 10 in order to help promote efficient usage of data communication, such as via wireless communication device 40. Accordingly, the ECU 60 may obtain feedback or information from numerous sources, such as the sensors 22-32 and 36, the V2X unit 34, the GNSS receiver 38, and then control the development and uploading (or non-uploading) of detection reports to indicate various events along the route such as the pothole 92. The ECU 60 may be considered a controller, a control module, etc., and may include any variety of electronic processing devices, memory devices, input/output (I/O) devices, and/or other known components, and may perform various control and/or communication related functions. In an example embodiment, ECU 60 includes an electronic memory device 62 that stores sensor readings (e.g., sensor readings from sensors 22-32 and 36), look up tables or other data structures (e.g., look up tables relating to calibratable weights as described below), algorithms (e.g., the algorithm embodied in the methods described below), etc. The memory device 62 may maintain a buffer consisting of data collected over a predetermined period of time or during predetermined instances (e.g., event times, position qualifiers for events in a given time, severity qualifiers for events in a given time, etc.). The memory device 62 or just a portion thereof, can be implemented or maintained in the form of an electronic data structure, as is understood in the art. ECU 60 also includes an electronic processing device 64 (e.g., a microprocessor, a microcontroller, an application specific integrated circuit (ASIC), etc.) that executes instructions for software, firmware, programs, algorithms, scripts, etc. that are stored in memory device 62 and may partially govern the processes and methods described herein.

Depending on the particular embodiment, the ECU 60 may be a stand-alone vehicle electronic module (e.g., a specialized or dedicated crowd sensing controller), it may be incorporated or included within another vehicle electronic module (e.g., a body control module), or it may be part of a larger network or system (e.g., a navigation system), or it may be a slave control unit implementing low-level controls on the basis of a supervising vehicle control unit, to name a few possibilities. Accordingly, the ECU 60 is not limited to any one particular embodiment or arrangement and may be used by the present method to control one or more aspects of the crowd sensing system 10 operation. The crowd sensing system 10 and/or ECU 60 may also include a calibration file, which is a setup file that defines the commands given to actuating components such as the wireless communication device 40.

Wireless carrier system 70 may be any suitable cellular telephone system. Carrier system 70 is shown as including a cellular tower 72; however, the carrier system 70 may include one or more of the following components (e.g., depending on the cellular technology): cellular towers, base transceiver stations, mobile switching centers, base station controllers, evolved nodes (e.g., eNodeBs), mobility management entities (MMEs), serving and PGN gateways, etc., as well as any other networking components required to connect wireless carrier system 70 with the land network 76 or to connect the wireless carrier system with user equipment (UEs, e.g., which can include telematics equipment in vehicle 12). Carrier system 70 can implement any suitable communications technology, including GSM/GPRS technology, CDMA or CDMA2000 technology, LTE technology, etc.

Apart from using wireless carrier system 70, a different wireless carrier system in the form of satellite communication can be used to provide uni-directional or bi-directional communication with the vehicle. This can be done using one or more communication satellites (not shown) and an uplink transmitting station (not shown). Uni-directional communication can be, for example, satellite radio services, wherein programming content (news, music, etc.) is received by the uplink transmitting station, packaged for upload, and then sent to the satellite, which broadcasts the programming to subscribers. Bi-directional communication can be, for example, satellite telephony services using the one or more communication satellites to relay telephone communications between the vehicle 12 and the uplink transmitting station. If used, this satellite telephony can be utilized either in addition to or in lieu of wireless carrier system 70.

Land network 76 may be a conventional land-based telecommunications network that is connected to one or more landline telephones and connects wireless carrier system 70 to vehicle backend services facility 80. For example, land network 76 may include a public switched telephone network (PSTN) such as that used to provide hardwired telephony, packet-switched data communications, and the Internet infrastructure. One or more segments of land network 76 could be implemented through the use of a standard wired network, a fiber or other optical network, a cable network, power lines, other wireless networks such as wireless local area networks (WLANs), or networks providing broadband wireless access (BWA), or any combination thereof.

Computers 78 (only one shown) can be some of a number of computers accessible via a private or public network such as the Internet. In one embodiment, each such computer 78 can be used for one or more purposes, such as for providing navigational services to a plurality of vehicles and other electronic network computing devices, including vehicles 12-18 and personal mobile device 90. Other such accessible computers 78 can be, for example: a service center computer where diagnostic information and other vehicle data can be uploaded from the vehicle; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12, backend facility 80, or both. A computer 78 can also be used for providing Internet connectivity such as DNS services or as a network address server that uses DHCP or other suitable protocol to assign an IP address to vehicle 12.

Vehicle backend facility 80 is located remotely from vehicle 12. The backend facility 80 may be designed to provide the vehicle electronics 20 with a number of different system back-end functions through use of one or more electronic servers 82 and, in many cases, may provide navigation-related services to the plurality of vehicles 12-18 as well as other vehicles. The backend facility 80 may be a physical call center, or it could be a cloud-based server or the like. In many embodiments, the backend facility 80 provides route suggestions (or a planned route), along with information concerning events along the route based on feedback from the vehicle 12 as the vehicle travels, as described in more detail below. The backend facility 80 includes vehicle backend servers 82 and databases 84, which may be stored on a plurality of memory devices. Vehicle backend facility 80 may include any or all of these various components and, preferably, each of the various components are coupled to one another via a wired or wireless local area network. Backend facility 80 may receive and transmit data via a modem connected to land network 76. Data transmissions may also be conducted by wireless systems, such as IEEE 802.11x, GPRS, and the like. Those skilled in the art will appreciate that, although only one backend facility 80 and one computer 78 are depicted in the illustrated embodiment, numerous remote facilities 80 and/or computers 78 may be used. Moreover, a plurality of backend facilities 80 and/or computers 78 can be geographically distributed and can each coordinate information and services with one another, as those skilled in the art will appreciate.

Servers 82 can be computers or other computing devices that include at least one processor and that include memory. The processors can be any type of device capable of processing electronic instructions including microprocessors, microcontrollers, host processors, controllers, vehicle communication processors, and application specific integrated circuits (ASICs). The processors can be dedicated processors used only for servers 82 or can be shared with other systems. The at least one processor can execute various types of digitally-stored instructions, such as software or firmware, which enable the servers 82 to provide a wide variety of services. This software may be stored in computer-readable memory and can be any suitable non-transitory, computer-readable medium. For example, the memory can be any of a number of different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), magnetic or optical disc drives. For network communications (e.g., intra-network communications, inter-network communications including Internet connections), the servers can include one or more network interface cards (NICs) (including wireless NICs (WNICs)) that can be used to transport data to and from the computers. These NICs can allow the one or more servers 82 to connect with one another, databases 84, or other networking devices, including routers, modems, and/or switches. In one particular embodiment, the NICs (including WNICs) of servers 82 may allow SRWC connections to be established and/or may include Ethernet (IEEE 802.3) ports to which Ethernet cables may be connected to that can provide for a data connection between two or more devices. Backend facility 80 can include a number of routers, modems, switches, or other network devices that can be used to provide networking capabilities, such as connecting with land network 76 and/or cellular carrier system 70.

Databases 84 can be stored on a plurality of memory, such as a powered temporary memory or any suitable non-transitory, computer-readable medium. For example, the memory can be any of a number of different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), magnetic or optical disc drives, that stores some or all of the software needed to carry out the various external device functions discussed herein. One or more databases at the backend facility 80 can store various information and can include a database for storing a plurality of detection reports about various events that could impact traffic.

Figure 2:
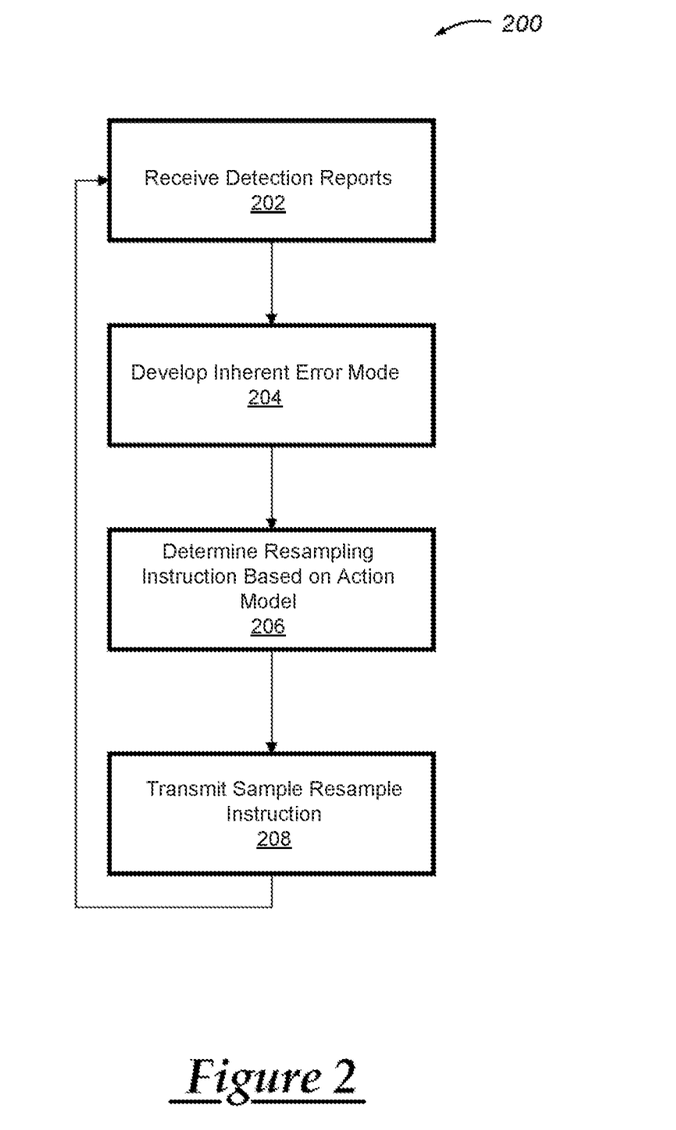
FIG. 2 is a flowchart of an embodiment of a method of selective sensing described within the context of the vehicle crowd sensing system of FIG. 1.
Figure 3:
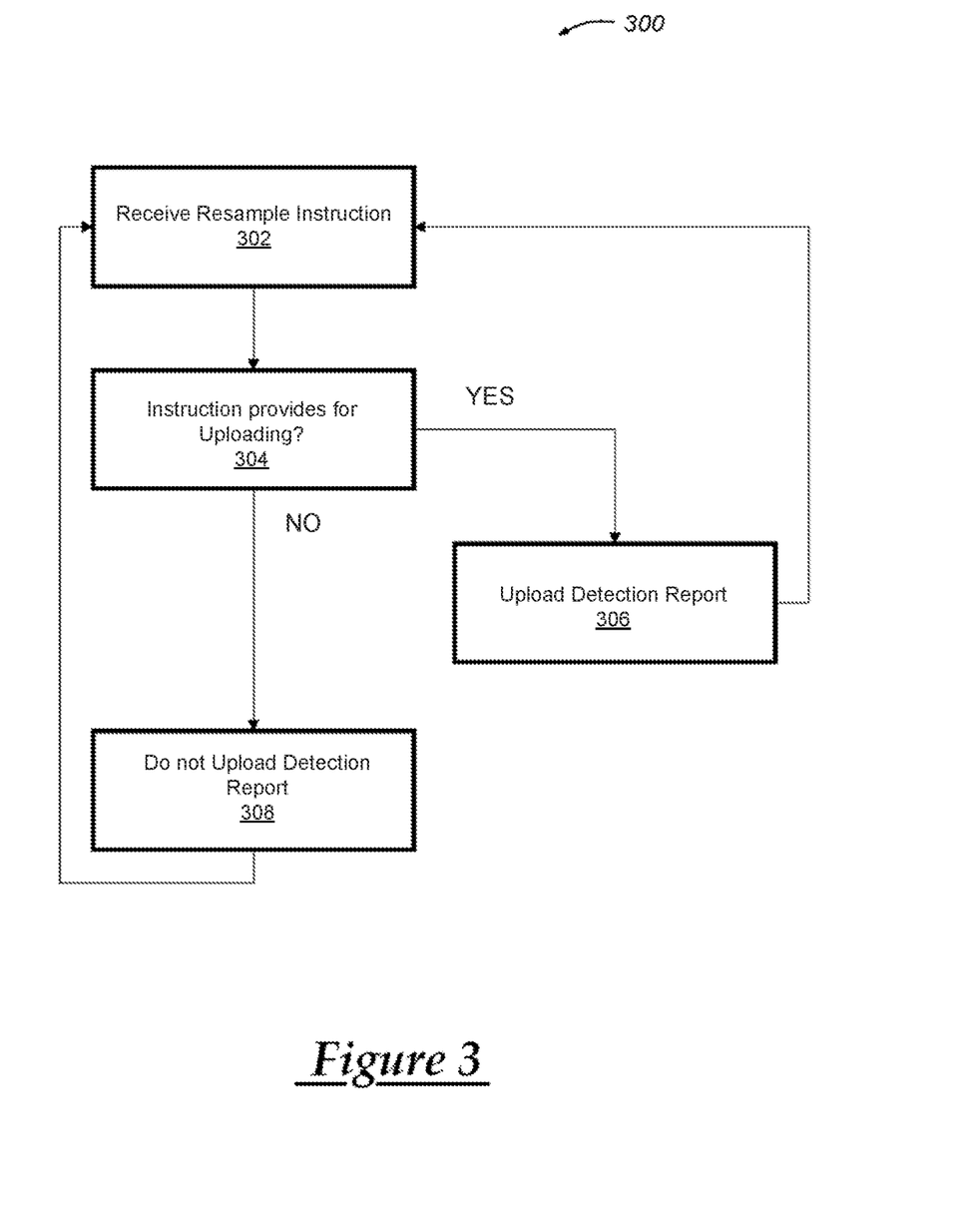
FIG. 3 is a flowchart of another embodiment of a method of selective sensing described within the context of the vehicle crowd sensing system of FIG. 1.

FIGS. 2 and 3 illustrate methods 200, 300, respectively, which may be used for selective sensing, using the system described above with respect to FIG. 1. It should be understood that the steps of each method 200, 300 are not necessarily presented in any particular order and that performance of some or all of the steps in an alternative order is possible and is contemplated. Further, it is likely that the methods 200, 300 could be implemented in other systems that are different from the crowd sensing system 10 illustrated in FIG. 1, and that the description of the methods 200, 300 within the context of the system 10 is only an example. Additionally, it is contemplated that the methods 200, 300 be run concurrently, with the method 200 being focused on backend processing and the method 300 being focused on vehicle processing.

In FIG. 2, the method 200 is primarily from a cloud-side or server-side perspective. Step 202 of the method involves receiving a plurality of detection reports from a first set of vehicles. For example, vehicles 16, 18 may encounter the pothole 92. The pothole 92 may be sensed by the vehicles, such as with the dynamic sensor unit 30. In another embodiment, the data regarding presence of pothole 92 may be received via V2V information from the V2X unit 34. Upon detection of the pothole 92, the ECU 60 may generate a detection report. The detection report includes the event (e.g., the pothole 92), a position qualifier of the event (e.g., GPS coordinates via GNSS receiver 38), and a severity qualifier of the event (e.g., a score from 1-10 of the impact and/or duration of the pothole 92 based on readings from the dynamic sensor unit 30). The detection report can be transmitted to the backend facility 80 for processing via the server 82 (e.g., a cloud server). With the detection report, it is not necessary for all information to be transmitted together. For example, separate transmissions may deliver the detection report information in some embodiments.

While described with respect to the pothole 92 of FIG. 1, it should be understood that the system 10 and methods 200, 300 can be implemented with a wide variety of events that may impact vehicular traffic. Event classifications may include more transient traffic impediments, such as moderate to heavy traffic, accidents, objects in the road, intermittent lane closures, weather hazards such as icy or wet roads, etc. Event classifications may also include longer lasting traffic impediments, such as construction-based closures, structural damage such as potholes, etc. Each event can be associated with a position qualifier and a severity qualifier. The position qualifier typically includes GPS coordinates or some other position indicator, such as road segment metadata. The severity qualifier provides some indication as to the certainty, potential impact, and/or duration of the event. In some embodiments, the severity qualifier may be a set value for each event classification, or it could be derived from sensor data when the event is incurred (e.g., as described above, a score from a look up table of the impact and/or duration of the pothole 92 based on readings from the dynamic sensor unit 30). The event, the event classification, the position qualifier, and/or the severity qualifier of the detection report may be one or more coded signals transmitted from the wireless communication unit 40 to the backend facility 80.

Step 204 of the method involves developing an inherent error model for the event, such as pothole 92 as encountered by vehicles 16, 18. The inherent error model compiles the position qualifiers of the event and the severity qualifiers of the event. In one embodiment, the inherent error model determines four criterion variables, and based on these variables, it can be decided if sufficient samples (i.e., detection reports) have been received to infer the real-world event. In one embodiment, the four criterion variables include a number of uploaded detection reports for the event, the standard deviation of the position qualifiers for the event, the standard deviation of the severity qualifiers for the event, and a hybrid criteria value that takes into account the first three criteria. The first criterion variable is a number of uploaded detection reports for the event. This may include the number of uploaded samples (n) in a certain past time frame. The past time frame may be an event determined value or may vary depending on the event classification (e.g., transient traffic impediments may have a shorter time frame than longer lasting traffic impediments). The desired sample set size (n) may be calculated in accordance with the following equation:

$$n = Z_a^2 \frac{\sigma_{pop}^2}{\rho^2} \qquad \text{Equation 1}$$

where $Z_a$ is a Z-score with confidence level $\alpha$, $\sigma_{pop}$ is a population standard deviation, and $\rho$ is the required precision. Typically, the population standard deviation is a calibratable estimate instead of an actual population standard deviation. Continuing with the example above, for detection of the pothole 92, to estimate its location within 5 meters ($\rho=5$) of the true mean with 95% confidence ($\alpha=0.05$, $Z_a=-2$), an estimate regarding variation in the samples is that one standard deviation is about 10 m. This results in a sample size estimate of n=16. Again, this is just an example and the various values and estimates can be changed depending on the event and implementation of the method.

The second criterion variable in this embodiment of the hybrid criterion model is a standard deviation of the position qualifiers for the event. The standard deviation of the position qualifiers for the event may be calculated in accordance with the following equation:

$$s_p = \sqrt{\frac{\Sigma(x_i - \bar{x})^2}{n-1}} \qquad \text{Equation 2}$$

where $s_p$ is the standard deviation of event positions, $x_i$ is the event i's position, and $\bar{x}$ is the mean position of all the detected events. If the position qualifier is a set of coordinates, the standard deviation may be calculated for each coordinate in the coordinate pair.

The third criterion variable in this embodiment of the hybrid criterion model is a standard deviation of the severity qualifiers for the event. The standard deviation of the severity qualifiers for the event may be calculated in accordance with the following equation:

$$s_s = \sqrt{\frac{\Sigma(x_i - \bar{x})^2}{n-1}} \quad \text{Equation 3}$$

where $s_s$ is the standard deviation of event severity scores, $x_i$ is the event i's severity, and $\bar{x}$ is the mean severity of all the detected events.

The fourth criterion variable in this embodiment of the hybrid criterion model is a hybrid criteria value. The hybrid criteria value takes into account the number of uploaded detection reports for the event (e.g., the first criterion variable), the standard deviation of the position qualifiers for the event (e.g., the second criterion variable), and the standard deviation of the severity qualifiers for the event (e.g., the third criterion variable). In one embodiment, the hybrid criteria value is calculated in accordance with the following equation:

$$h = w_1 \cdot \frac{n - n_{p0}}{n_{p0}} + w_2 \cdot \frac{n - n_{s0}}{n_{s0}} + w_3 \cdot \frac{s_{p0} - s_p}{s_{p0}} + w_4 \cdot \frac{s_{s0} - s_s}{s_{s0}} \quad \text{Equation 4}$$

wherein h is the hybrid criteria value; w1, w2, W3, and W4 are the weights; n is the number of uploaded samples; Sp is the standard deviation of the position qualifiers for the event; $s_s$ is the standard deviation of the severity qualifiers for the event; and $n_{po}$, nso, $S_{po}$, and $s_{so}$ are reference targets. The reference targets $n_{po}$ and $n_{so}$ are the desired sample set size for the position qualifiers and severity qualifiers, respectively, which can be calculated in accordance with Equation I above. The reference targets $s_{p0}$ and $s_{so}$ are the desired standard deviation of the event position and severity. These values can be generated from vehicle test data, and will depend on the type of vehicle, the type of event, the specifications of the vehicle components (e.g., if more sensitive or better sensors are provided on the vehicle), etc. The weights are calibratable values based on a classification of the event. For example, the standard deviation of the positions may be less relevant when the event is a large traffic jam, but may be more relevant when the event is a small pothole. The weights can be accordingly adjusted depending on the event type.

When the hybrid criteria value is greater than a hybrid criteria threshold, the number of detection reports for a given event is sufficient. However, when the hybrid criteria value is less than a hybrid criteria threshold, the number of detection reports for a given event is not sufficient and more reports are expected to corroborate and more accurately infer ground-truth events. It should be understood that recitations of comparing steps such as "less than" or "greater than" are open-ended such that they could include "less than or equal to" or "greater than or equal to," respectively, and this will depend on the established parameter evaluations in the desired implementation. In one particular embodiment, if the hybrid criteria value calculated in accordance with Equation 4 above is greater than a hybrid criteria threshold of zero, then the number of detection reports for a given event is sufficient and further resampling may not be needed. Continuing with the example provided herein and illustrated in FIG. 1, with a hybrid criteria value less than zero, the resampling instruction for vehicles 12, 14 will be 0% since the number of detection reports is not sufficient and it will be necessary for vehicles 12 and 14 to report pothole 92. If the hybrid criteria value calculated in accordance with Equation 4 above is less than zero, then the number of detection reports is sufficient. Accordingly, continuing with the example, the resampling instruction for vehicles 12, 14 will be between 0-100%, as determined in step 206, below. The resampling instruction represents a probability, and it instructs a vehicle in the second set of vehicles 12, 14 to not upload (and/or drop) a detection report with this probability. For example, if the resampling instruction is 25%, vehicles 12, 14 will drop detection events with a 25% probability.

In step 206, a resampling instruction is determined based on an action model. The action model is at least partly a factor of the inherent error model. When the inherent error model includes a hybrid criteria model and value that is greater than zero, the action model may change the resampling instruction from 0% to a higher proportion in order to allow vehicles in the second set of vehicles 12, 14 to drop detection reports and to minimize data transmission while maintaining accuracy of the sampled events. The action model can be used to determine a resampling instruction δ, which will be sent to vehicles (e.g., vehicles 12, 14) to instruct them how to probabilistically upload detection reports to save cellular bandwidth. In one embodiment, the action model includes a proportional/integral/derivative (PID) policy evaluation. More particularly, the PID policy evaluation includes a proportion of the hybrid criteria model, an integral of the hybrid criteria model, an integral of the hybrid criteria model, and a derivative of the hybrid criteria model. This may be accomplished using the fourth criterion variable—the hybrid criteria value, and calculated in accordance with the equation below $$u(t) = K_p h(t) + K_i \int_0^t h(\tau) d\tau + K_d \frac{dh(t)}{dt} \quad \text{Equation 5}$$

where u(t) is the action or the number of detection reports to be reduced, with u(t) being greater than or equal to zero; h(t) is the hybrid criterion value at time t; and $K_p$, $K_i$, and $K_d$ are the coefficients for the proportional, integral, and derivative terms, respectively. The PID policy evaluation is desirable as each of the proportion, integral, and derivative can be selectively tunable and/or usable for the action model. The $K_p$, $K_i$, and $K_d$ coefficients can be developed specifically for certain kinds of vehicles, roadways, events, etc. Also, the $K_p$, $K_i$, and $K_d$ coefficients can be auto-tuned in accordance with various methods, such as the Relay Method. Accordingly, different PID policy evaluations can be established for different types of roads, events, geographical areas, etc.

In running the action model u(t) above, a value greater than or equal to zero can be generated to help determine the output resampling instruction δ. When u(t) is zero, it means no action is needed since the desired sample size of detection reports has been met, but when u(t) equals 1, the heuristic meaning is "100% more than needed." As specified above in one particular example, if the hybrid criteria value h(t) is less than zero, then the number of detection reports is not sufficient. In this case, the action model and/or PID policy evaluation is disabled, and the resampling instruction output is δ(t)=0% (since more detection reports are necessary to infer a ground-truth event). However, if h(t) is greater than zero, than the action model and/or PID policy is enabled and the resampling instruction output δ can be calculated according to the following equation:

$$\delta(t) = \frac{u(t)}{1+u(t)} \qquad \text{Equation 6}$$

wherein δ(t) is the resampling instruction output for a given time t with δ(t) being between 0% and 100%, and u(t) is the outcome of the action model.

Step 208 of the method involves transmitting the resampling instruction δ. Continuing with the example, if detection reports are generated for pothole 92 by a first set of vehicles 16, 18 and then sent to backend facility 80 for processing with server 82, a resampling instruction δ can be calculated and stored in the database 84. When a second set of vehicles 12, 14 are within a prescribed range of the event or pothole 92, the resampling instruction δ can be transmitted from backend facility 80 to the respective vehicle wireless communication device 40 of each vehicle 12, 14. The prescribed range may be a set parameter for each classification of events (e.g., a pothole has a 0.5 mile radius, heavy traffic has a 2 mile radius, etc.). In another embodiment, the prescribed range can be determined based on planned routes. For example, if one vehicle receives a planned route via GNSS receiver 38, if an event is on that route, the resampling instruction δ for that event may be transmitted to the vehicle when the route is sent. Other examples are certainly possible. After transmitting the resampling instruction, the method can return to step 202 to continue receiving detection reports, which may then be received in accordance with the determined resampling instruction, which can dynamically change as the inherent error model and action model are updated.

FIG. 3 is a selective sensing method 300, but instead of being from the backend side, the method 300 is from the vehicle side, such as from the perspective of vehicles 12, 14. At step 302, the resampling instruction δ, as described above with respect to the method 200, is received. For example, the vehicles 12, 14 can receive resampling instructions via wireless carrier system 70 and wireless communication device 40 from the backend facility 80 relating to the pothole 92. The instruction may be received via any operable means, such as cellular LTE, WiFi, DSRC, etc. When the vehicles 12, 14 encounter the pothole 92, they may use information from various sensors 22-32 and ECU 60, for example, to develop subsequent detection reports.

Step 304 of the method 300 involves determining whether the resampling instruction δ provides for uploading or non-uploading. This may be done by normalizing the resampling instruction δ between 0 (e.g., closer to 0 results a higher probability of uploading) and 1 (e.g., closer to 1 results in a lower probability of uploading), and possibly taking into account one or more factors. For example, if the resampling instruction δ is less than 0.5, but greater than 0.25, and the likelihood is greater that more events are expected on the cloud server, uploading may be provided. In one advantageous embodiment, the resampling instruction δ is a probability, which is used in conjunction with a base sampling rate, a local cost, and a local confidence to determine whether the resampling instruction provides for uploading or non-uploading. This may be accomplished using the following equation:

$$f(\alpha,\beta,\gamma,\delta)=(\alpha-\delta)\cdot\beta\cdot\gamma \qquad \text{Equation 7:}$$

where f is normalized between 0 and 1, α is the base sampling rate, β is the local cost, γ is the local confidence, and δ is the resampling probability instruction. The result of function f can then be rounded between 0 (e.g., closer to 0 results in non-uploading) and 1 (e.g., closer to 1 results in uploading). The base sampling rate α can be a default value of 100%, and depends on market penetration. For example, in the first model year, if only 10% of vehicles include the methods and systems herein, it would likely be desirable for all vehicles to report for the base sampling rate (e.g., α is 100%). However, if 60% of vehicles include the methods and systems herein in a later year, there is less need for all vehicles to report (e.g., α is 80%). The local cost β factors in the cost of data transmission. For example, different users have different data plans, and this cost may be used as a factor in the method. Additionally, end of the month costs may be higher than costs at other times of the month. Accordingly, the local cost may be greater toward the end of the month, resulting in less uploading frequency during these times. The local confidence γ takes into account the estimated reliability and/or accuracy of the detection report. For example, a more high-end vehicle may have better or more sensitive sensors. Accordingly, the local confidence γ of such a vehicle may be set to promote more uploads, since the data from that vehicle may be more reliable than a lower-end vehicle with less sensors or less accurate sensors. The base sampling rate, the local cost, and the local confidence are individual vehicles' parameters that are typically predetermined or determined at the vehicle, for example, with ECU 60, whereas the resampling instruction is typically determined offsite, using a cloud server or the like (e.g., server 82).

In step 306, when the resampling instruction δ provides for uploading, the detection report will be uploaded to the backend facility. For example, if after vehicles 12, 14 encounter the pothole 92, vehicle 12 may upload its detection report to the backend facility 80. Vehicle 12 may have more accurate sensors than vehicle 14, which may contribute to the likelihood of uploading. The method may then return to step 302 to continue receiving resampling instructions regarding upcoming events.

In step 308, when the resampling instruction δ provides for non-uploading, the detection report will not be uploaded to the backend facility. For example, if after vehicles 12, 14 encounter the pothole 92, vehicle 14 may not upload its detection report to the backend facility 80. Instead, the report may be dropped or deleted locally, from for example, memory 62 of the ECU 60. The method may then return to step 302 to continue receiving resampling instructions regarding upcoming events.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering any one or more of the following: "A"; "B"; "C"; "A and B"; "A and C"; "B and C"; and "A, B, and C."

What is claimed is:

1. A method of selective sensing for a vehicle crowd sensing system, comprising the steps of:
   receiving a plurality of detection reports from a first set of vehicles, wherein each detection report includes an event, a position qualifier of the event, and a severity qualifier of the event;
   developing an inherent error model for the event, wherein the inherent error model includes a weighted summation of a number of the detection reports, a standard deviation of the position qualifiers, and a standard deviation of the severity qualifiers
   determining a resampling instruction for the event, wherein the resampling instruction is based on an action model and wherein the action model includes a proportional integral derivative policy evaluation of a result of the inherent error model; and
   transmitting the resampling instruction for the event to a second set of vehicles.

2. The method of claim 1, wherein the second set of vehicles are within a prescribed temporal or spatial range of the event.

3. The method of claim 1, wherein the resampling instruction causes a first portion of the second set of vehicles to upload detection reports for the event.

4. The method of claim 3, wherein the resampling instruction causes a second portion of the second set of vehicles to not upload detection reports for the event.

5. The method of claim 1, wherein the weighted summation includes weights, and wherein the weights are calibratable values based on a classification of the event.

6. The method of claim 1, wherein the result of the inherent error model provides a hybrid criteria value calculated in accordance with the following:

$$h = w_1 \cdot \frac{n - n_{p0}}{n_{p0}} + w_2 \cdot \frac{n - n_{s0}}{n_{s0}} + w_3 \cdot \frac{S_{p0} - S_p}{S_{p0}} + w_4 \cdot \frac{S_{s0} - S_s}{S_{s0}}$$

wherein h is the hybrid criteria value; w1, w2, w3, and w4 are the weights; n is the number of the detection reports; Sp is the standard deviation of the position qualifiers for the event; ss is the standard deviation of the severity qualifiers for the event; and np0, ns0, Sp0, and ss0 are reference targets.

7. The method of claim 6, further comprising when the result of the inherent error model is less than a hybrid criteria threshold, the action model is disabled and the resampling instruction is set to 0%.

8. The method of claim 6, further comprising when the result of the inherent error model is greater than a hybrid criteria threshold, the action model is enabled and the resampling instruction is set to a value between 0% and 100%.

9. The method of claim 1, wherein the proportional/integral/derivative (PID) policy evaluation includes a proportion of the result of the inherent error model, an integral of the result of the inherent error model, and a derivative of the result of the inherent error model, each of the proportion, the integral, and the derivative being selectively usable for the action model.

10. The method of claim 1, wherein each detection report further includes a set of time qualifiers of the event.

11. A method of selective sensing for a vehicle crowd sensing system, comprising the steps of:
    receiving, at a vehicle, a resampling instruction from a backend facility for an event, wherein the resampling instruction is based on an action model and the action model is at least partly a factor of an inherent error model, wherein the inherent error model includes a weighted summation of a number of the detection reports, a standard deviation of the position qualifiers, and a standard deviation of the severity qualifiers;
    determining, by the vehicle, whether the resampling instruction provides for uploading or non-uploading;
    when the resampling instruction for the event provides for uploading, uploading, by the vehicle, a detection report for the event to the backend facility, wherein the detection report includes a position qualifier of the event and a severity qualifier of the event; and
    when the resampling instruction for the event provides for non-uploading, not uploading, by the vehicle, the detection report for the event to the backend facility.

12. The method of claim 11, wherein the resampling instruction is a probability, and the determining step uses the probability, a base sampling rate, a local cost, and a local confidence to determine whether the resampling instruction provides for uploading or non-uploading.

13. The method of claim 12, wherein the base sampling rate, the local cost, and the local confidence are individual vehicles' parameters.

14. A vehicle crowd sensing system, comprising:
    a server that includes a processor and non-transitory computer-readable memory, the non-transitory computer-readable memory storing a computer program; and
    a database that is accessible by the server, the database storing a plurality of detection reports for an event and received from a first set of vehicles, wherein each detection report includes a position qualifier of the event and a severity qualifier of the event;
    wherein the computer program, when executed by the processor, causes the server to:
        develop an inherent error model for the event, wherein the inherent error model includes a weighted summation of a number of the detection reports, a standard deviation of the position qualifiers, and a standard deviation of the severity qualifiers,
        determine a resampling instruction for the event, wherein the resampling instruction is based on an action model and wherein the action model includes a proportional integral derivative policy evaluation of a result of the inherent error model, and transmit the resampling instruction for the event to a second set of vehicles.

\* \* \* \* \*